Feb. 7, 1928.  1,658,322
H. B. BERNARD
TREATMENT OF NATURAL GAS GASOLINE, CASINGHEAD GASOLINE,
NATURAL GASOLINE, AND THE LIKE
Filed July 22, 1924
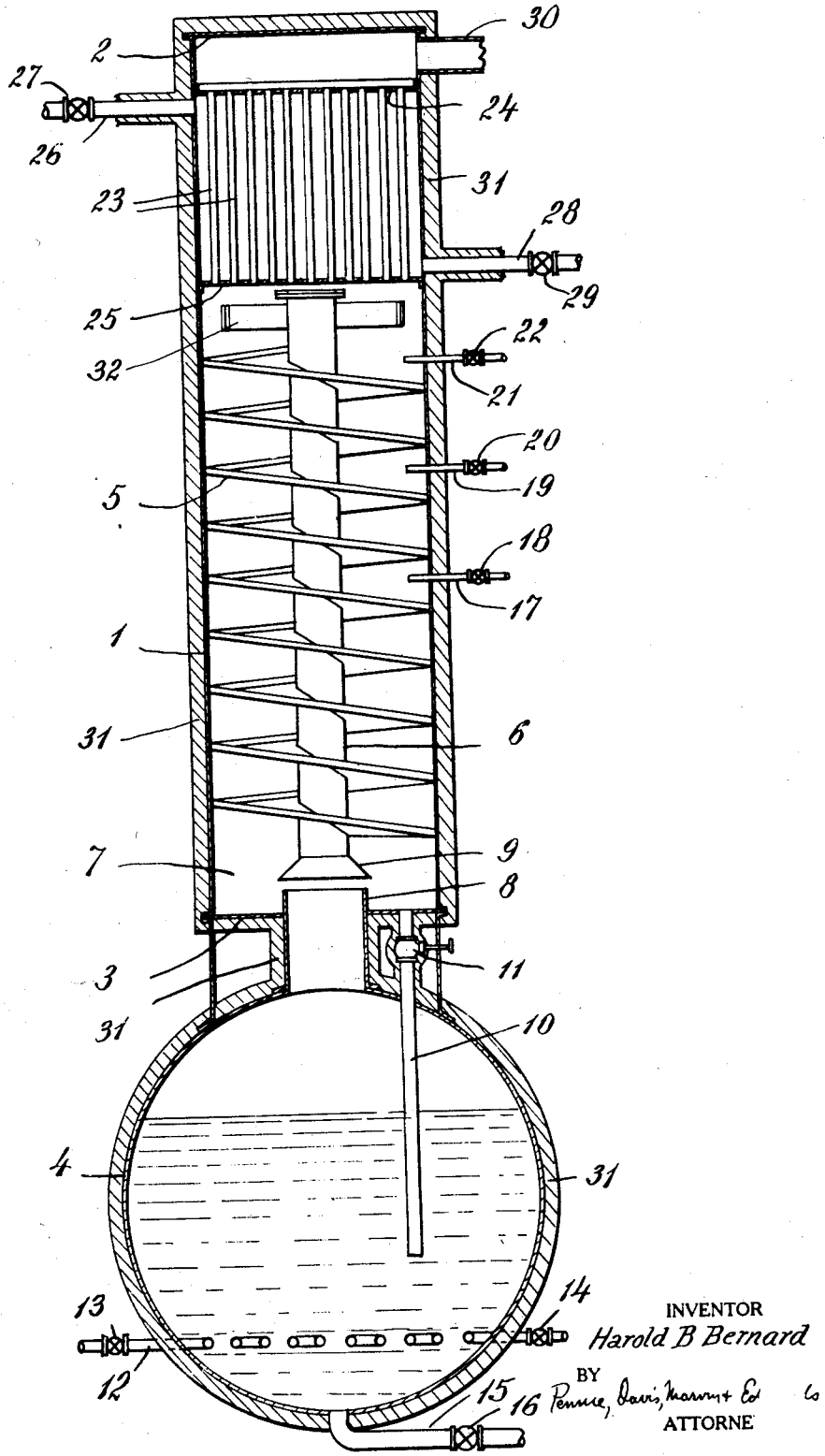
INVENTOR
Harold B Bernard
BY
Pennie, Davis, Marvin + Ed
ATTORNE Patented Feb. 7, 1928.

1,658,322

UNITED STATES PATENT OFFICE.

HAROLD B. BERNARD, OF TULSA, OKLAHOMA, ASSIGNOR TO SINCLAIR OIL AND GAS COMPANY, OF TULSA, OKLAHOMA, A CORPORATION OF MAINE.

TREATMENT OF NATURAL-GAS GASOLINE, CASINGHEAD GASOLINE, NATURAL GASOLINE, AND THE LIKE.

Application filed July 22, 1924. Serial No. 727,444.

This invention relates to an improved method of treating gasoline products derived from natural gas, casinghead gas and the like, such as natural gas gasoline, casinghead gasoline, and natural gasoline, in a crude or more or less refined state, for the production, without excessive loss, of a gasoline product having improved stability and improved vapor-pressure temperature characteristics.

In recovering gasoline products from natural gas or casinghead gas, the gas may be subjected to compression treatment, to refrigeration treatment, to absorption treatment with liquid or solid absorbents, or to various combinations of these treatments for separating the condensible constituents comprising the desired gasoline fraction from the gaseous and vaporous constituents which are associated therewith in the natural-gas or casinghead gas. The crude gasoline products recovered from such gases have a high vapor pressure, and are commonly referred to, in this respect, as "wild". This high vapor-pressure, or "wildness", introduces difficulties into the transportation and storage of the product at ordinary temperatures and pressures, increases the fire risk involved in handling the product, and increases evaporation losses.

This relatively high vapor pressure of the crude gasoline product is due, primarily, to the presence in the crude product of dissolved or entrained light vapors and gases which are incondensible at ordinary temperatures and pressures and which are not a desirable constituent of commercial gasoline. Several methods for the elimination of these undesirable constituents have been proposed, but, hitherto, such proposals have resulted in unnecessary loss of heavier constituents it is desirable to retain in the finished product. For example, it has been customary to subject natural gasoline, and the like, to a treatment known as "weathering" which consists in permitting spontaneous evaporation of the crude liquid product in open receptacles or in receptacles maintained under reduced pressure, or to a treatment known as "steaming" which consists in removing lighter vapors and gases at somewhat elevated temperature, for a sufficient period to eliminate the undesirable constituents; but such methods are unsatisfactory in that they cause the loss of a large proportion of the crude liquid product which is entirely suitable for use as a commercial product.

According to the present invention, the crude gasoline product is treated to separate the more volatile constituents undesirable in the finished gasoline product and any uncondensible gases present without separating any substantial amount of the desirable gasoline constituents included in the crude product by a method having several important advantages and characteristics whereby improved heat transfer is effectively promoted between the various constituents of the gasoline product.

According to the process of the present invention, the crude gasoline product is subjected to treatment in a helical tower in which the liquid is flowed downwardly over the turns of the helix in the tower in countercurrent to the vaporized constituents flowing upwardly through the tower the treated gasoline product being withdrawn from the lower end of the tower and the separated vapors and gases comprising the undesirable constituents from the upper end of the tower The process of the present invention may be carried out in a helical tower arranged in conjunction with a still, the crude gasoline product being introduced at or near the top of the tower and passing down over the turns of the helix while the vaporized constituents, liberated in the still and in the tower, pass upwardly in a reverse direction, the unvaporized portion of the crude product together with any condensed vapors entering the still from the tower, the separated gases and vapors being withdrawn from the top of the tower and the treated gasoline product collecting in the still and being withdrawn therefrom.

In this construction and operation, the flow of the vaporized constituents upwardly through the tower is free and unobstructed while the vaporized constituents are nevertheless brought into intimate heat exchanging relation with the liquid flowing down through the tower. Spraying or cascading of the liquid through the vapors and bubbling of the vaporized constituents through the liquid is avoided.

Spraying of the liquid is objectionable in that it tends to leave some of the liquid in the form of fine drops, the surface tension of which will prevent their evaporation, and they tend to be mechanically entrained and carried with the vaporized constituents. Cascading of the liquid, or bubbling of the vaporized constituents through the liquid, are objectionable in that they impose unnecessary fraction loss and tend to choke the treating apparatus.

In the improved process of the present invention, the crude gasoline product fed into the still flows downwardly over the helical surfaces of the tower and is heated by direct contact with the vapor constituents passing upwardly through the tower and by indirect contact with the vaporized constituents at a higher temperature in the next lower turn of the helix. The vaporized constituents entering the bottom of the tower from the still, and liberated within the tower, are cooled by direct contact with the downflowing liquid and by indirect contact with the liquid at a lower temperature flowing downwardly in the next higher turn of the helix. The flow of the vaporized constituents over the liquid also tends to sweep the liquid surfaces and promote the heat transfer between the liquid and vaporized constituents. The liquid and the vaporized constituents are thus brought into intimate heat exchanging relation without, however, cascading or spraying the liquid through the vaporized constituents or bubbling the vaporized constituents through the liquid.

The invention will be further described in connection with the accompanying drawing illustrating, in a somewhat conventional and diagrammatic manner, one form of apparatus adapted for the practice of the process of the invention. The helical tower illustrated in the drawing is of the general type described in an application of John E. Bell, filed April 1, 1924, Serial No. 703,338.

The accompanying drawing shows a helical tower arranged in conjunction with a still, partly in section and partly in elevation and with parts broken away, adapted for carrying out the process of the invention.

The helical tower illustrated comprises a circular shell 1, closed at its upper and lower ends by plates 2 and 3, and supported upon the shell of the still 4. A helical partition 5, arranged within the tower shell about the central core 6, divides the lower part of the tower into a continuous passage generally helical in arrangement. The core 6 is supported from the shell by struts 32 and is closed at both its upper and lower ends. A liquid reservoir 7 is provided in the lower part of the tower by the projection, upwardly and inwardly into the tower, of the vapor inlet 8 from the still 4. A projection 9 is provided at the lower end of the core 6 for discharging downflowing liquid into the compartment 7. From the reservoir 7, the liquid flows into the still through the pipe 10 provided with a valve 11. The still 4 is provided with a heating coil 12, having appropriate means for regulating the application of heat such as valves 13 and 14. A pipe 15, provided with a valve 16, permits the regulated withdrawal of liquid from the still 4.

Inlets 17, 19 and 21, provided with valves 18, 20 and 22 respectively, are arranged in the upper part of the tower for introducing the crude gasoline product into the tower and over the helix 5 at a series of successive points as may be desired. The helical partition dividing the tower into a helical passage may be provided with distributing means, such as baffles or ripples spaced apart, to promote uniform distribution of the downflowing liquid or it may be made up of a series of plates or trays.

A condenser, comprising a series of tubes 23 arranged between upper and lower partitions 24 and 25 is provided in the upper end of the tower above the helical partition. Vaporized constituents escaping from the upper end of the tower pass through the tubes or pipes 23 and are therein subjected to heat exchange with any suitable cooling medium flowing about the tubes in the space between the partitions. The cooling medium may be introduced through connection 26 and withdrawn through connection 28, the flow of the cooling medium being regulated by valves 27 and 29 in the inlets and outlets respectively. The separated vapors and gases escape from the upper end of the tower through the connection 30, communicating with the tower between the end plate 2 and the partition 24.

The still 4, the vapor connection 8 between the still and the tower, and the tower 1 may be protected with suitable insulation 31.

While in the construction illustrated the helical tower and the condenser are arranged in superimposed relation upon the still, it will be evident that the helical tower and the condenser might be arranged as separate units, or that the tower might be superimposed on the still and the condenser arranged as a separate unit, with appropriate connections to conduct vapors from the still to the tower and from the tower to the condenser and to conduct liquids from the tower to the still, and from the condenser to the tower. The vertical superimposed relation is, however, compact and easily insulated against heat loss.

In carrying out the process of the invention in the apparatus illustrated, the crude gasoline product is introduced into the upper end of the tower over the helical partition therein and flowed downwardly to the still over the helical partition. Heat is applied to the oil in the still, for example, by passing steam through the heating coil 12, and the vapors from the still pass upwardly through the helical passage in the tower in counter-current to the downflowing liquid. The heavier constituents which are vaporized in the still, and which are suitable as components of the desired gasoline product, are thus cooled and condensed in the tower, while the lighter constituents of the crude gasoline introduced into the tower, undesirable in the finished gasoline product, are eliminated, escaping from the upper end of the tower.

The temperature of the liquid in the still is in general somewhat higher than the temperature of the liquid flowing from the bottom of the tower into the still. The application of heat, however, can be regulated so that the temperature of the liquid entering the still approximates that of the liquid in the still, and so that practically all of the constituents undesirable in the finished product can be separated in the tower itself.

The separation effected in the tower, and the character of the finished product and the character of the separated constituents are subject to control, and the process of the invention is adapted to the treatment of various crude gasoline products of different characteristics and of mixtures of such products for the production of a uniform finished product or different products of any desired vapor-pressure temperature characteristics.

The character of the finished product collecting in the still can be controlled by regulating the temperature prevailing at the lower end of the tower under any given pressure. In general, the higher the temperature maintained at the lower end of the tower, the less volatile will be the finished product, and vice versa. The pressure and temperature maintained in the tower, for the production of any given finished product, are to a certain extent interdependent, and control of the character of the product by regulation of the temperature can be supplemented by regulation of the pressure. In general, the higher the pressure maintained in the tower, at any given temperature, the more volatile will be the finished product. The character of the vaporized constituents escaping from the upper end of the tower can be controlled, within limits, by similar regulation of the temperature, with reference to the pressure prevailing in the tower, at the upper end of the tower.

In the apparatus illustrated, the upper end of the helical tower may be cooled by expansion of the crude gasoline thereinto, or by means of the supplementary cooler arranged in the upper end of the tower, or by both. Where supplementary cooling is employed in the upper end of the helical tower, an increased temperature can be maintained in the still to insure driving out all of the lighter constituents, undesirable in the finished product, which might otherwise tend to remain in the liquid in the still; and in this case, additional heat is supplied to the liquid in the still to replace that lost by the supplementary cooling, this additional heat corresponding to the increase in temperature of the liquid in the still.

The crude gasoline may be introduced into the tower under substantially the pressure prevailing in the tower and without appreciable expansion, and cold brine, or other suitable cooling medium, may be circulated about the cooling tubes 23 in the upper end of the tower at a rate sufficient to condense and return to the tower all constituents desirable in the finished gasoline product and to permit the escape only of those constituents undesirable in the lighter product. Cooling of the upper end of the tower may also be effected by expanding a relatively volatile material, such as a very light natural gasoline or light fraction thereof, into the space about the cooling tubes 23.

Where the crude gasoline product is available under substantial pressure, however, for example, where the crude product from a compression or a compression and refrigeration process or from a compression operation carried out upon a gasoline product initially separated by absorption is directly treated, the crude gasoline product may be expanded into the tower by reduction in pressure upon entrance into the tower, for example, by suitable control of valves 18, 20 and 22, and the cooling effect due to the expansion of the introduced crude gasoline product and the vaporization of the lighter constituents employed in cooling the upper end of the helical tower. Cooling by expansion of the introduced crude gasoline product and by circulation of a cooling medium through the supplementary cooler in the upper end of the tower may be employed in conjunction.

Where several grades of crude gasoline are to be treated, they may, with advantage, be successively introduced into the tower in the order of their volatility, the most volatile crude product being introduced at the highest point in the tower and the less volatile crude products being introduced at a lower point in the tower. For example, in the treatment of three grades of crude gasoline, the lightest and most volatile may be introduced through connection 21, the next lightest through connection 19, and the next lightest through connection 17. The lightest and most volatile crude product has the greatest cooling effect due to the increased vaporization effected upon expansion thereof, and the successively heavier fractions have a progressively decreasing cooling effect in the order of their volatility, so that by introducing successively a series of progressively lighter fractions, a progressively decreasing temperature can be maintained upon the vaporized constituents flowing upwardly through the tower.

Each of a series of various grades of crude gasoline treated and blended into the tower may be expanded into the tower to assist in cooling the upper end of the tower, and where, as is frequently the case, the more volatile crude products are under a higher pressure than the less volatile crude products and are expanded over a greater pressure reduction, the relative cooling effect of the more volatile crude products is increased due to the relatively increased vaporization upon reduction of pressure to that prevailing in the tower, and a more pronounced progressive cooling at the upper end of the tower can be obtained. Where several grades of crude gasoline are treated and blended in the same operation, they may also be admixed before introduction into the helical tower and introduced at a single point, either at the pressure prevailing in the tower or with expansion.

In some cases, where a more volatile finished product is desired, atmospheric temperature may be sufficient to effect the necessary vaporization in the still, and in the lower part of the tower. Where this is the case, the insulation may be omitted from the still, and from all or from the lower part of the tower, and the operation can be carried out without the application of heat other than that conveyed through the exposed walls of the still and the tower from the atmosphere. In such operation, the temperature differential between the lower end and the upper end of the tower, and the character of the finished product and of the vaporized constituents escaping from the upper end of the tower, can be controlled by regulating the cooling effected in the upper end of the helical tower, either by regulating the expansion of the crude gasoline product introduced into the tower, or by regulating the temperature and rate of flow of a cooling medium circulated through the supplementary cooler, or by both.

In carrying out the process of the invention in the apparatus illustrated, the crude gasoline product is thus introduced into the upper end of the helical tower and flowed downwardly through the helical passage therein to the still in countercurrent to the upwardly flowing vaporized constituents liberated in the still and in the tower. Heat exchange is promoted between the upwardly flowing vaporized constituents and the downwardly flowing liquid, directly between liquid and vaporized constituents within the same turn of the helical passage and indirectly between the liquid in each turn of the helical passage and the vaporized constituents of higher temperature in the next lower turn. By controlling the temperature at the upper and lower end of the helical tower, in accordance with the invention, equilibrium can be established throughout the tower and close control of the constituents separated by vaporization can be effected; and efficient separation of the more volatile and incondensible constituents, undesirable in the finished product, is effected while at the same time loss of heavier and less volatile constituents, desirable in the finished product, is minimized or substantially eliminated. The separated vaporized constituents escape from the upper end of the tower and may be collected and put to any suitable use, and the treated and improved gasoline product is withdrawn from the still.

I claim·

1. An improved process of treating gasoline products derived from natural gas, casinghead gas, and the like, which comprises introducing the crude gasoline product into the upper end of a tower and causing the liquid to flow downwardly therethrough in a helical path and in a substantially continuous stream in countercurrent to vaporized constituents flowing upwardly through the said helical path without spraying the liquid through the vapors or bubbling the vapors through the liquid, withdrawing the treated gasoline product from the lower end of the tower and withdrawing separated vapors and gases from the upper end of the tower.

2. An improved process of treating gasoline products derived from natural gas, casinghead gas, and the like, which comprises expanding the crude gasoline product into the upper end of a tower and causing the liquid to flow downwardly therethrough in a helical path and in a substantially continuous stream in countercurrent to vaporized constituents flowing upwardly through the said helical path without spraying the liquid through the vapors or bubbling the vapors through the liquid, withdrawing the treated gasoline product from the lower end of the tower and withdrawing separated vapors and gases from the upper end of the tower.

3. An improved process of treating gasoline products derived from natural gas, casinghead gas, and the like, which comprises introducing the crude gasoline product into the upper end of a tower and causing the liquid to flow downwardly therethrough in a helical path and in a substantially continuous stream in countercurrent to vaporized constituents flowing upwardly through the said helical path without spraying the liquid through the vapors or bubbling the vapors through the liquid, withdrawing the treated gasoline product from the lower end of the tower, cooling the upper end of the tower, and withdrawing separated vapors and gases from the upper end of the tower.

4. An improved process of treating gasoline products derived from natural gas, casinghead gas, and the like, which comprises introducing the crude gasoline product into the upper end of a tower and causing the liquid to flow downwardly therethrough in a helical path and in a substantially continuous stream in countercurrent to vaporized constituents flowing upwardly through the said helical path without spraying the liquid through the vapors or bubbling the vapors through the liquid, withdrawing the treated gasoline product from the lower end of the tower, cooling the upper end of the tower above the point of introduction of the crude gasoline product, and withdrawing separated vapors and gases from the upper end of the tower.

5. An improved process for treating gasoline products derived from natural gas, casinghead gas and the like, which comprises expanding the crude gasoline product into the upper end of a tower and causing the liquid to flow downwardly therethrough in a helical path and in a substantially continuous stream in countercurrent to vaporize constituents flowing upwardly through the said helical path without spraying the liquid through the vapors or bubbling the vapors through the liquid, applying heat to the lower end of the tower, withdrawing the treated gasoline product from the lower end of the tower and withdrawing separated vapors and gases from the upper end of the tower.

6. An improved process of treating gasoline products derived from natural gas, casinghead gas, and the like, which comprises expanding the crude gasoline product into the upper end of a tower and causing the liquid to flow downwardly therethrough in a helical path and in a substantially continuous stream in countercurrent to vaporized consituents flowing upwardly through the said helical path without spraying the liquid through the vapors or bubbling the vapors through the liquid, withdrawing the treated gasoline product from the lower end of the tower, cooling the upper end of the tower, and withdrawing separated vapors and gases from the upper end of the tower.

7. An improved process of treating gasoline products derived from natural gas, casinghead gas, and the like, which comprises passing the crude gasoline product to a still downwardly in a substantially continuous stream through a helical path in a tower, applying heat to the liquid in the still and driving off vapors therefrom into the lower end of the tower, causing the vapors to flow upwardly through the helical path in the tower in countercurrent to the downwardly flowing liquid without bubbling the vapors through the liquid or spraying the liquid through the vapors, withdrawing the treated gasoline product from the still and withdrawing the separated vapors and gases from the upper end of the tower.

8. An improved process of treating gasoline products derived from natural gas, casinghead gas, and the like, which comprises expanding the crude gasoline product into the upper end of a tower, flowing the liquid in a substantially continuous stream downwardly through a helical path in the tower to a still, applying heat to the liquid in the still and driving off vapors therefrom into the lower end of the tower, causing the vapors to flow upwardly through the helical path in the tower in countercurrent to the downwardly flowing liquid without bubbling the vapors through the liquid or spraying the liquid through the vapors, withdrawing the treated gasoline product from the still and withdrawing separated vapors and gases from the upper end of the tower.

9. An improved process of treating gasoline products derived from natural gas, casinghead gas, and the like, which comprises expanding the crude gasoline product into the upper end of a tower, flowing the liquid in a substantially continuous stream downwardly through a helical path in the tower to a still, applying heat to the liquid in the still and driving off vapors therefrom into the lower end of the tower, causing the vapors to flow upwardly through the helical path in the tower in countercurrent to the downwardly flowing liquid without bubbling the vapors through the liquid or spraying the liquid through the vapors, withdrawing the treated gasoline product from the still, cooling the upper end of the tower and withdrawing separated vapors and gases from the upper end of the tower.

10. An improved process of treating gasoline products derived from natural gas, casinghead gas, and the like, which comprises passing the crude gasoline product downwardly through a tower to a still, causing the liquid to flow downwardly through the tower in a helical path and in a substantially continuous stream, applying heat to the liquid in the still and driving off vapors therefrom into the lower end of the tower, causing the vapors to flow upwardly through the helical path in the tower in countercurrent to the downwardly flowing liquid without bubbling the vapors through the liquid or spraying the liquid through the vapors, withdrawing the treated gasoline product from the still, cooling the upper end of the tower and withdrawing separated vapors and gases from the upper end of the tower.

11. An improved process of treating and blending a series of gasoline products derived from natural gas, casinghead gas and the like, which comprises introducing the crude gasoline products into the upper end of a tower, the most volatile crude product at the uppermost point and less volatile products at a lower point, flowing the liquid in a substantially continous steam downwardly through a helical path in the tower while vaporized constituents flow upwardly through the helical path in countercurrent, withdrawing the treated gasoline product from the lower end of the tower and withdrawing separated vapors and gases from the upper end of the tower.

12. An improved process of treating and blending a series of gasoline products derived from natural gas, casinghead gas and the like, which comprises introducing the crude gasoline products into the upper end of a tower, the most volatile crude product at the uppermost point and less volatile products at a lower point, flowing the liquid in a substantially continuous stream downwardly through a helical path in the tower to a still, applying heat to the liquid in the still and driving off vapors therefrom into the lower end of the tower, causing the vapors to flow upwardly through the helical path in the tower in countercurrent to the downwardly flowing liquid, withdrawing the treated gasoline product from the still and withdrawing separated vapors and gases from the upper end of the tower.

13. An improved process of treating and blending a series of gasoline products derived from natural gas, casinghead gas and the like, which comprises expanding the crude gasoline products into the upper end of a tower, the most volatile crude product at the uppermost point and less volatile products at a lower point, flowing the liquid in a substantially continuous stream downwardly through a helical path in the tower while vaporized constituents flow upwardly therethrough in countercurrent, withdrawing the treated gasoline product from the lower end of the tower and withdrawing separated vapors and gases from the upper end of the tower.

14. An improved process of treating and blending a series of gasoline products derived from natural gas, casinghead gas and the like, which comprises expanding the crude gasoline products into the upper end of a tower, the most volatile crude product at the uppermost point and less volatile products at a lower point, flowing the liquid in a substantially continuous stream downwardly through a helical path in the tower to a still, applying heat to the liquid in the still and driving off vapors therefrom into the lower end of the tower, causing the vapors to flow upwardly through the helical path in the tower in countercurrent to the downwardly flowing liquid therein, withdrawing the treated gasoline product from the still, cooling the upper end of the tower, and withdrawing separated vapors and gases from the upper end of the tower.

In testimony whereof I affix my signature.

HAROLD B. BERNARD.